Nov. 1, 1955    J. SERVIDIO    2,722,036

ELECTRICAL STUNNING DEVICE

Filed Jan. 25, 1954

INVENTOR.
JOSEPH SERVIDIO

BY Richard␣Geier
ATTORNEYS

United States Patent Office

2,722,036
Patented Nov. 1, 1955

2,722,036
ELECTRICAL STUNNING DEVICE
Joseph Servidio, Newark, N. J.
Application January 25, 1954, Serial No. 405,921
1 Claim. (Cl. 17—1)

This invention relates to an electrical stunning device and refers, more particularly, to an apparatus for stunning fish, eels, shell fish and the like.

Heretofore, the operation of cleaning by hand sea food, particularly eels, was most cumbersome and inconvenient, particularly as far as eels are concerned, which maintain signs of life and move long after the beginning of the cleansing operation.

An object of the present invention is to eliminate the drawbacks of prior art cleansing methods.

Another object is the provision of an electrical container for imparting a shock to fish, eels, shell fish and the like, as the result of which the operation of cleansing them is greatly facilitated.

A further object is the provision of an electrical container for shocking sea food which is inexpensive to manufacture and most effective and safe in operation.

A still further object is to facilitate the operation of skinning eels and the like, and cutting fish, by the use of an especially constructed electrical stunning device.

Other objects will become apparent in the course of the following specification.

In accomplishing the objects of the present invention, it was found desirable to provide an electrical stunning device having the form of a container into which the eels, fish and the like may be dropped, and the bottom of which consists of spaced, preferably perforated plate-like electrodes adapted to receive electrical current from conduits concealed between boards, constituting the side walls of the container.

The invention will appear more clearly from the following detailed description when taken in connection with the accompanying drawing, showing by way of example a preferred embodiment of the inventive idea.

Figure 1:
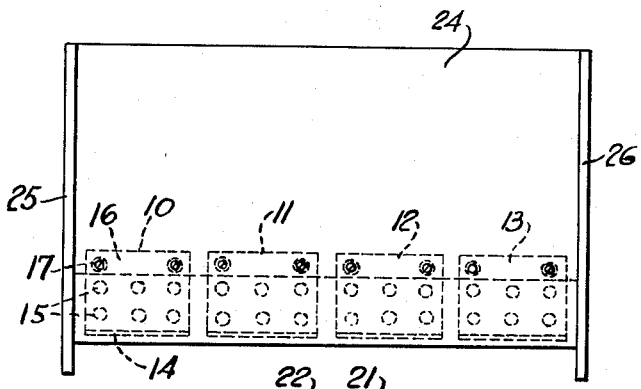
Figure 1 is a side view of the container constructed in accordance with the principles of the present invention.
Figure 2:
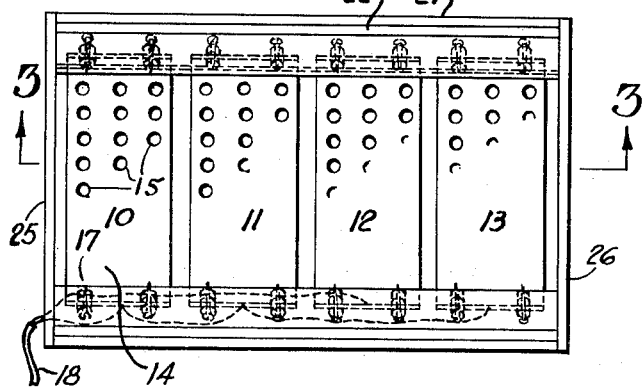
Figure 2 is a top view of the container shown in Fig. 1.
Figure 3:
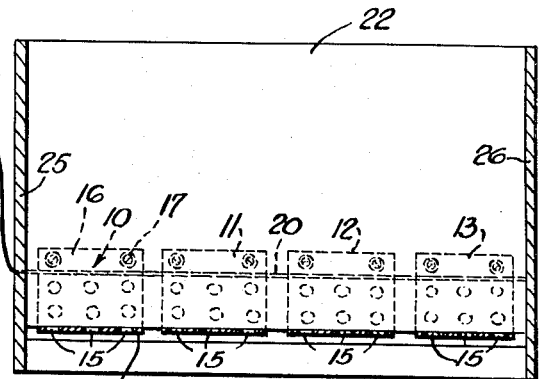
Figure 3 is a section along the line 3—3 of Fig. 2.
Figure 4:
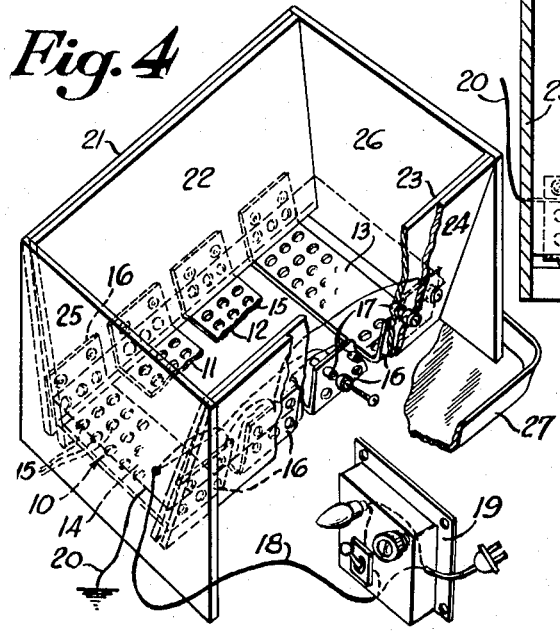
Figure 4 is a perspective view, partly broken away, of the container.

The electrical container shown in the drawing is particularly suitable for stunning or shocking eels, catfish, carp, and various other types of fish and shell fish which are characterized by extreme longevity and which unless stunned will make most difficult the work of an operator intending to skin or bone them.

The electrical portions of the container consist of electrodes 10, 11, 12 and 13 which are situated side by side and which are preferably spaced. Obviously, the number of electrodes and size thereof depend on the dimensions of the container. Since the electrodes are substantially alike, only one of them will be described in detail hereinafter.

The electrode 10 includes a flat bottom portion 14 which is provided with perforations 15 and which constitutes a part of the bottom of the container. The flat portion 14 terminates on opposite sides in side portions 16 which extend upwardly to about one-third or one-fourth of the height of the container. The side portions 16 are also provided with perforations 15 and they carry rubber washers 17. The electrodes 10 to 13 are all connected to a wire 18 leading to a switch 19. A ground wire 20 is also connected with the electrodes and its outer end may be conveniently attached to any suitable ground, such as a water pipe or the like.

The sides of the container are preferably constituted by pairs of plates 21 and 22, and 23 and 24, which are joined by side plates 25 and 26.

The plates or boards 23 and 24 are in contact along their upper edges and somewhat diverge toward the bottom to provide space for the wires 18 and 20, which extend between them. Similarly, the boards 21 and 22 engage each other at the top and somewhat diverge at the bottom to provide space for the ground wire. Furthermore, the diverging ends of the boards engage the upper portions 16 of the electrodes 10 to 13 which are held between the boards by means of washers 17 and screws extending through these washers.

It is thus apparent that the inner boards 22 and 23 cover the top portions of the electrodes from the inside, while the outer boards 21 and 24 extend further down than the boards 22 and 23 and cover the sides 16 of the electrodes completely.

The boards 21 to 24 are held in place by the side boards 25 and 26, which are firmly attached to the edges of the boards 21 to 25.

In operation, the electrical container is preferably placed upon a tray 27 or the like. Due to the provision of perforations 15 any water or moisture in the container will accumulate in the receptacle 27. The wire 20 is attached to a suitable ground and the switch 19 is plugged in. Then the operator drops eels, fish, or shell fish inside the container and upon the electrode plates 10 to 13 which constitute the bottom of the container. When the container is filled, the operator switches off the electrical current, whereupon the fish and the eels can be conveniently removed. Practical experience has shown that while fish and the eels are sufficiently stunned by this process, they are not killed completely and may be revived by placing them in water for three or four minutes.

It is apparent that the example shown above has been given by way of illustration and not by way of limitation, and that it is subject to many variations and modifications within the scope of the present invention. All such variations and modifications are to be included within the scope of the present invention.

What is claimed is:

An electrical stunning device, comprising a plurality of conducting plates situated side by side, each of said conducting plates having a perforated bottom portion and side portions on opposite sides of the bottom portion, the bottom portion of said plates being spaced and extending in the same plane, two inner boards situated opposite each other and covering from the inside the upper ends of said side portions, two outer boards having upper edges engaging the upper edges of said inner boards, said outer boards covering said side portions from the outside, whereby said side portions extend substantially between the inner and outer boards, two other boards extending substantially at right angles to said inner and outer boards and joined to the sides thereof, whereby a container is formed by the plates and the boards, a ground wire connected with said side portions and located between said inner and outer boards, and an electricity-supplying wire connected with said side portions and located between said inner and outer boards.

References Cited in the file of this patent
UNITED STATES PATENTS

| 909,814 | Norris | Jan. 12, 1909 |
| 1,034,251 | Kita | July 30, 1912 |
| 1,038,902 | Kruczynski | Sept. 17, 1912 |
| 1,075,995 | Smith | Oct. 14, 1913 |
| 2,519,783 | Nagl | Aug. 22, 1950 |

FOREIGN PATENTS

| 17,603 | Great Britain | 1914 |
| 406,916 | Great Britain | Mar. 8, 1934 |